US011137322B2

(12) United States Patent
Jung et al.

(10) Patent No.: US 11,137,322 B2
(45) Date of Patent: Oct. 5, 2021

(54) DIAGNOSING METHOD OF ENGINE CONDITION AND DIAGNOSTIC MODELING METHOD THEREOF

(71) Applicants: HYUNDAI MOTOR COMPANY, Seoul (KR); KIA MOTORS CORPORATION, Seoul (KR)

(72) Inventors: In-Soo Jung, Suwon-si (KR); Min-Ho Han, Seoul (KR); Seung-Hyun Lee, Suwon-si (KR); Dong-Chul Lee, Anyang-si (KR); Young-Ju Noh, Gimhae-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/682,784

(22) Filed: Nov. 13, 2019

(65) Prior Publication Data

US 2020/0393329 A1    Dec. 17, 2020

(30) Foreign Application Priority Data

Jun. 14, 2019    (KR) ........................ 10-2019-0070695

(51) Int. Cl.
*G01M 15/12*    (2006.01)
*G07C 5/08*    (2006.01)
*G06N 3/08*    (2006.01)
(52) U.S. Cl.
CPC ............ *G01M 15/12* (2013.01); *G06N 3/08* (2013.01); *G07C 5/0808* (2013.01); *G07C 5/0841* (2013.01)

(58) Field of Classification Search
CPC ....... G01M 15/12; G06N 3/08; G07C 5/0841; G07C 5/0808; F02B 75/06
See application file for complete search history.

(56) References Cited

U.S. PATENT DOCUMENTS 4,069,764 A * 1/1978 Teyssedre ............... B23P 23/06
104/172.4
6,481,269 B2 * 11/2002 Maruta ............... G01M 15/106
73/114.63

(Continued)

FOREIGN PATENT DOCUMENTS

| DE | 10-2017-221-727 A1 | 5/2019 |
|---|---|---|
| KR | 10-1889049 B1 | 8/2018 |
| KR | 2018-0121109 A | 11/2018 |

*Primary Examiner* — Phutthiwat Wongwian
*Assistant Examiner* — Diem T Tran
(74) *Attorney, Agent, or Firm* — McDonnell Boehnen Hulbert & Berghoff LLP

(57) ABSTRACT

A method of diagnosing an engine condition may include measuring a vibration of an engine, wherein assembly of the engine is completed in an automated end of line (EOL) process of an engine production, and primarily diagnosing the vibration of the engine during the EOL process using a primary deep learning classification model in which vibration signals of the engine are classified according to a feature through learning using a plurality of algorithms on the basis of big data with respect to multiple vibration signals measured at three or more positions on the engine, wherein the assembled state of the engine in the EOL process is classified into a normal state or an abnormal state by performing the primary diagnosing of the vibration of the engine.

13 Claims, 13 Drawing Sheets

(56) References Cited

U.S. PATENT DOCUMENTS

| | | | |
|---|---|---|---|
| 10,223,842 B1 | 3/2019 | Lee et al. | |
| 2001/0025626 A1* | 10/2001 | Antonioli | F02D 41/221 |
| | | | 123/456 |
| 2004/0260454 A1* | 12/2004 | Basir | G01M 15/05 |
| | | | 701/111 |
| 2015/0039139 A1* | 2/2015 | Meeuwsen | G05D 19/02 |
| | | | 700/280 |
| 2019/0304100 A1* | 10/2019 | Hever | G06K 9/4628 |

* cited by examiner

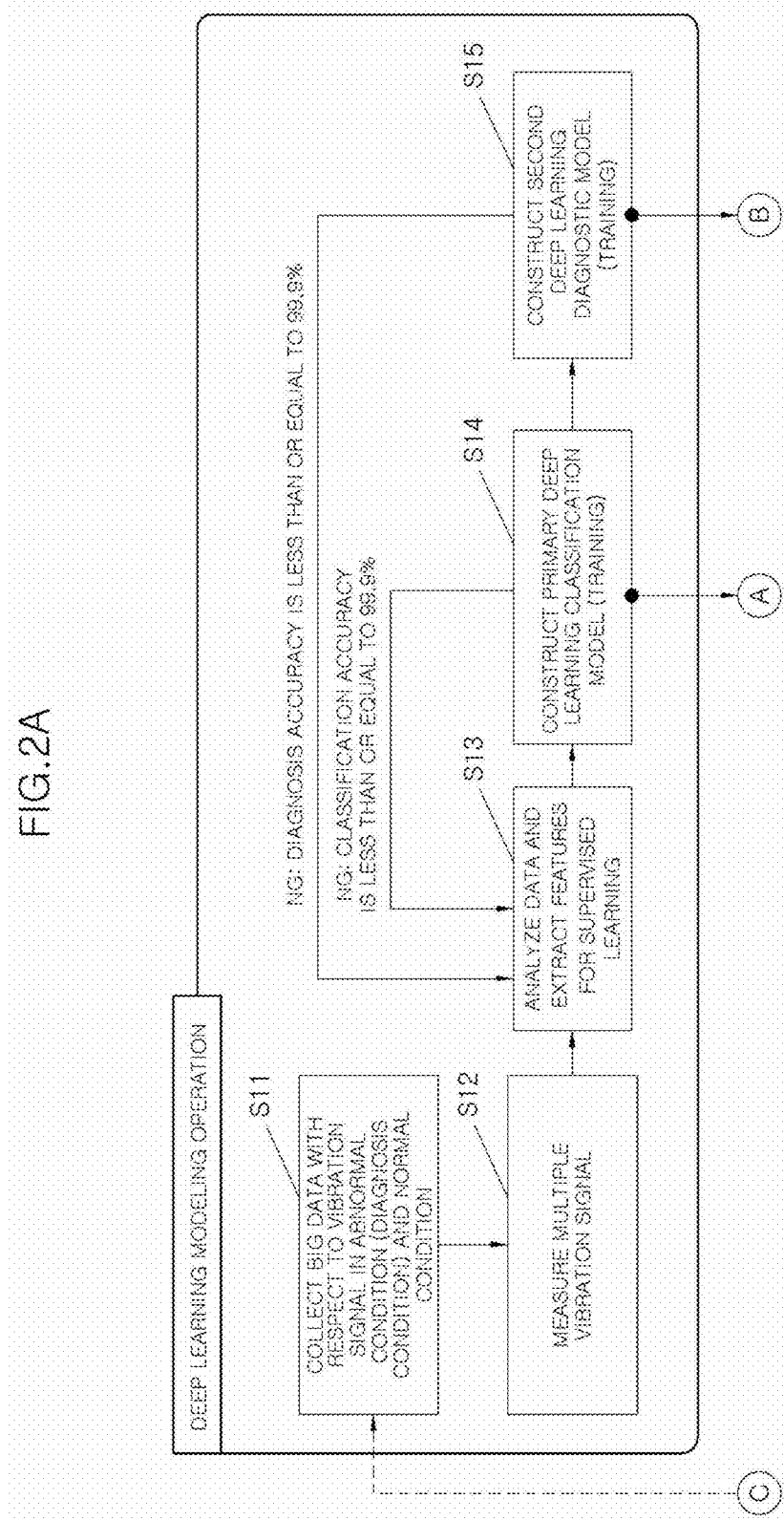

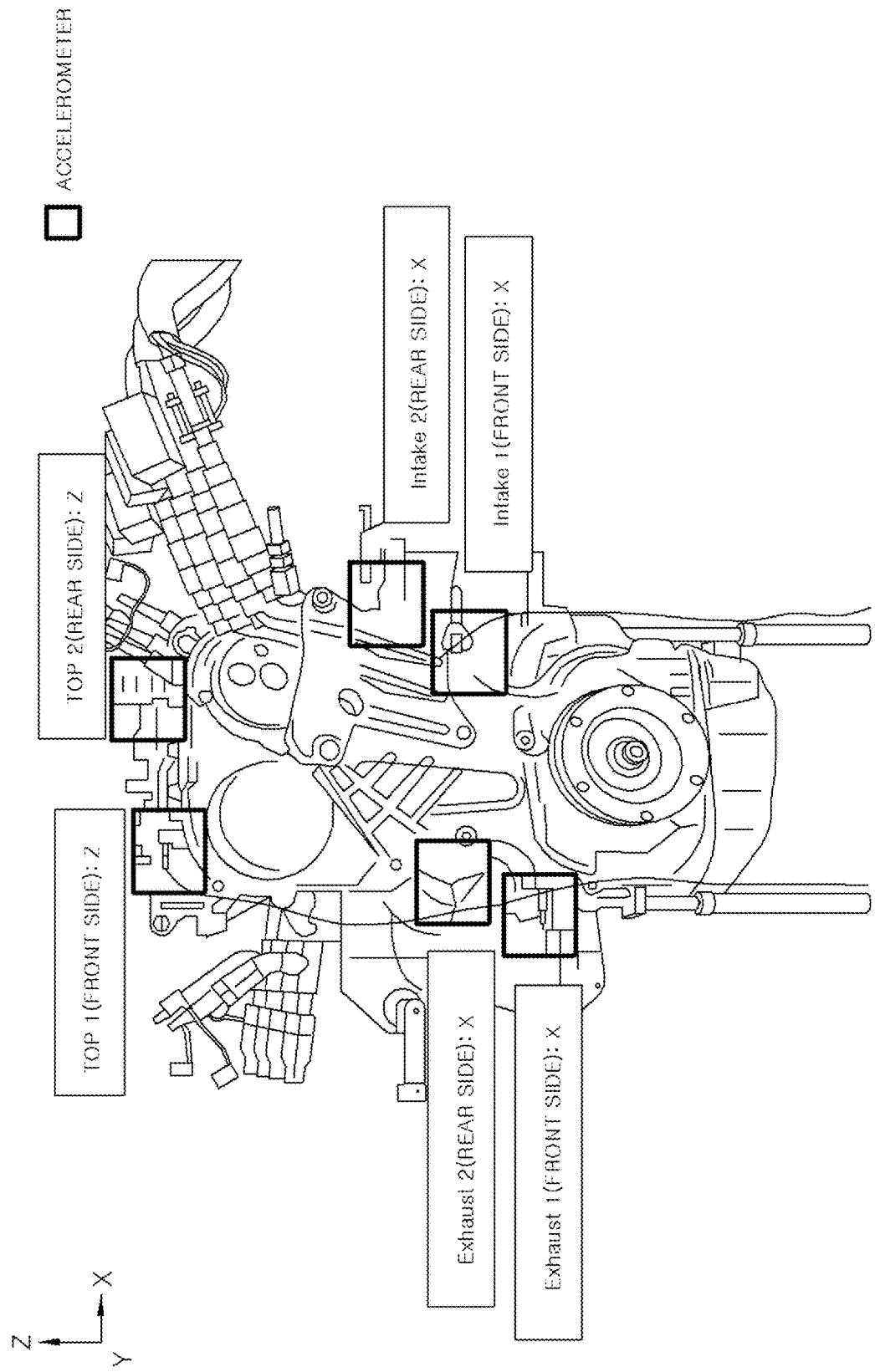

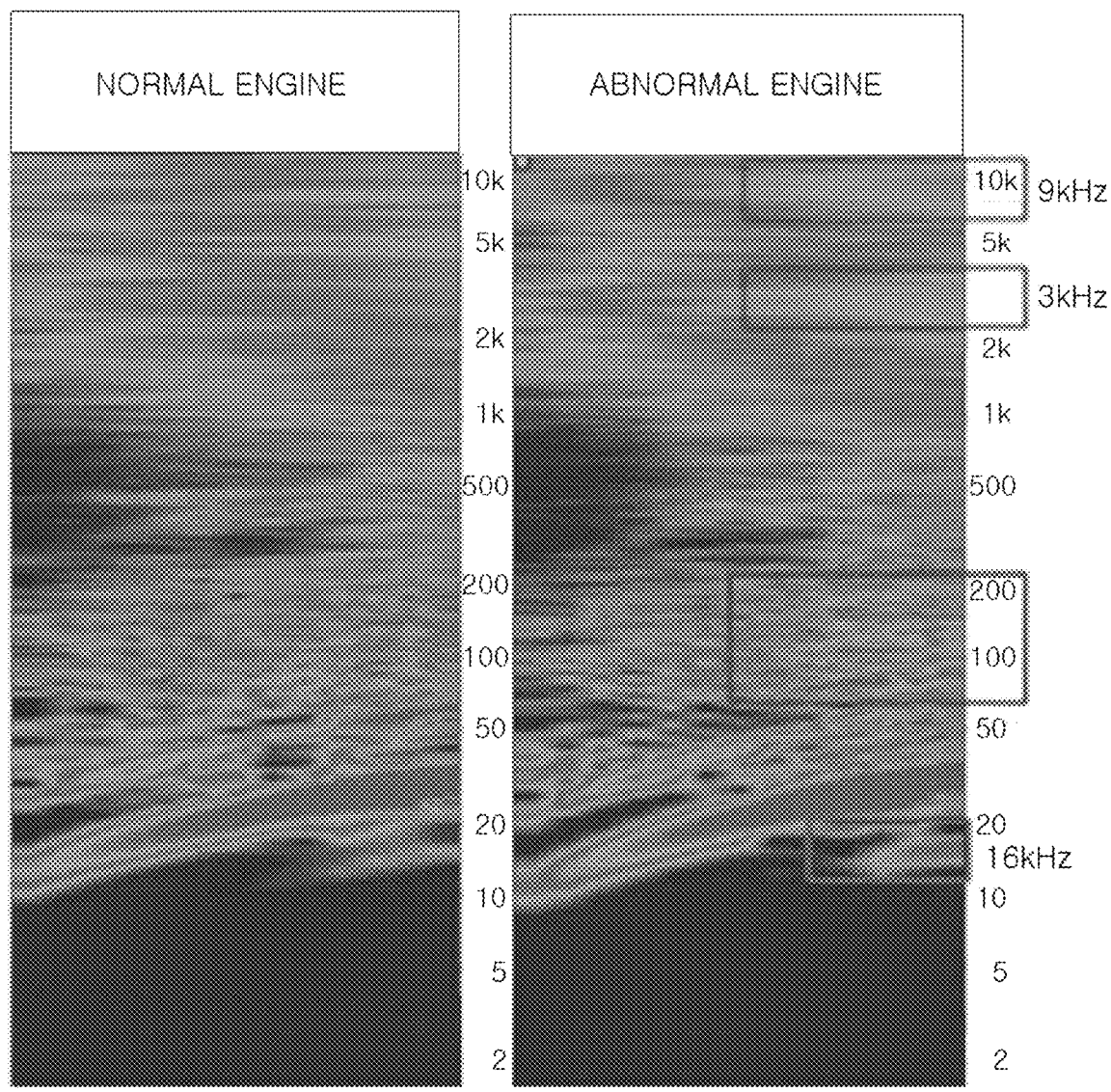

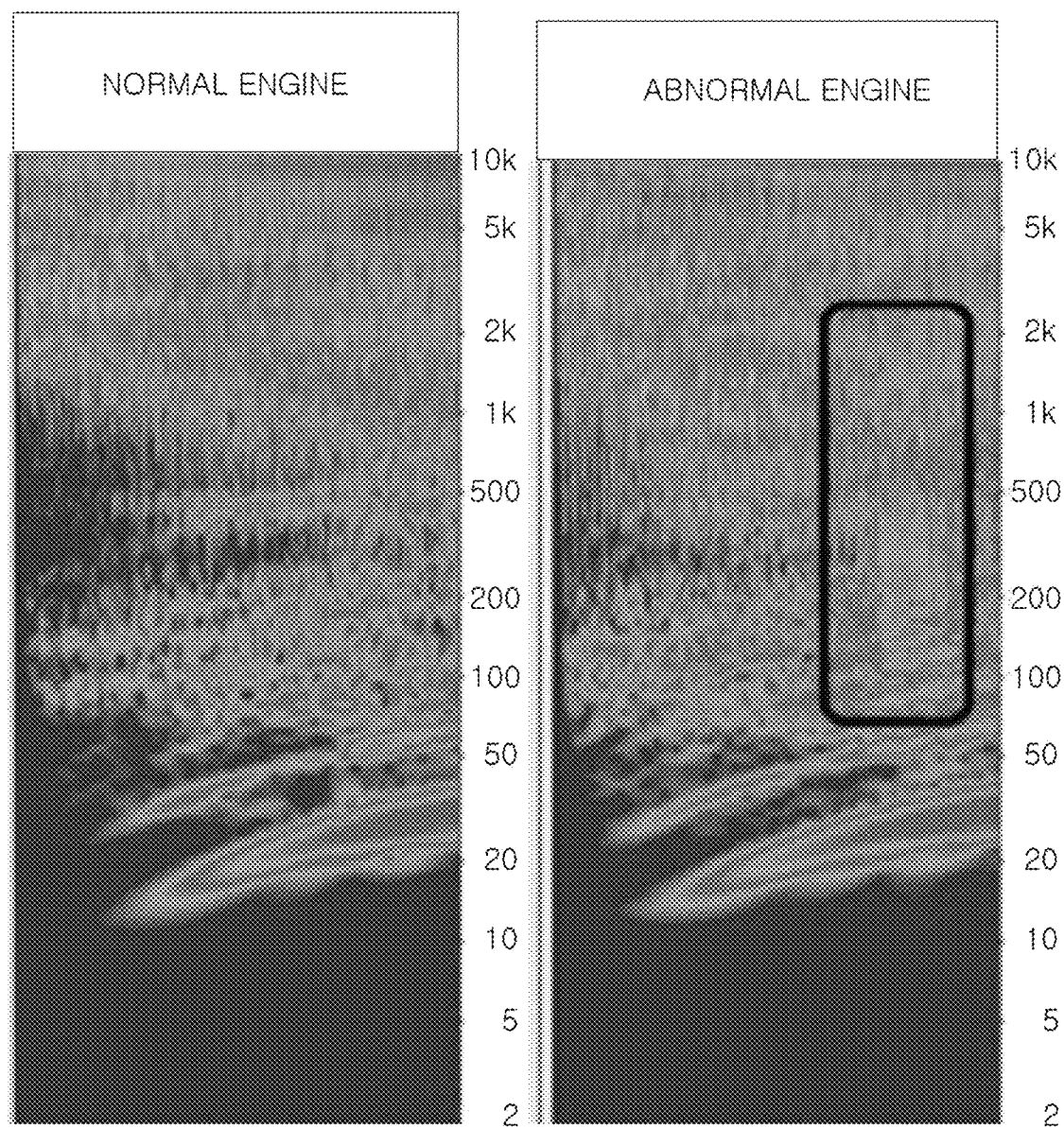

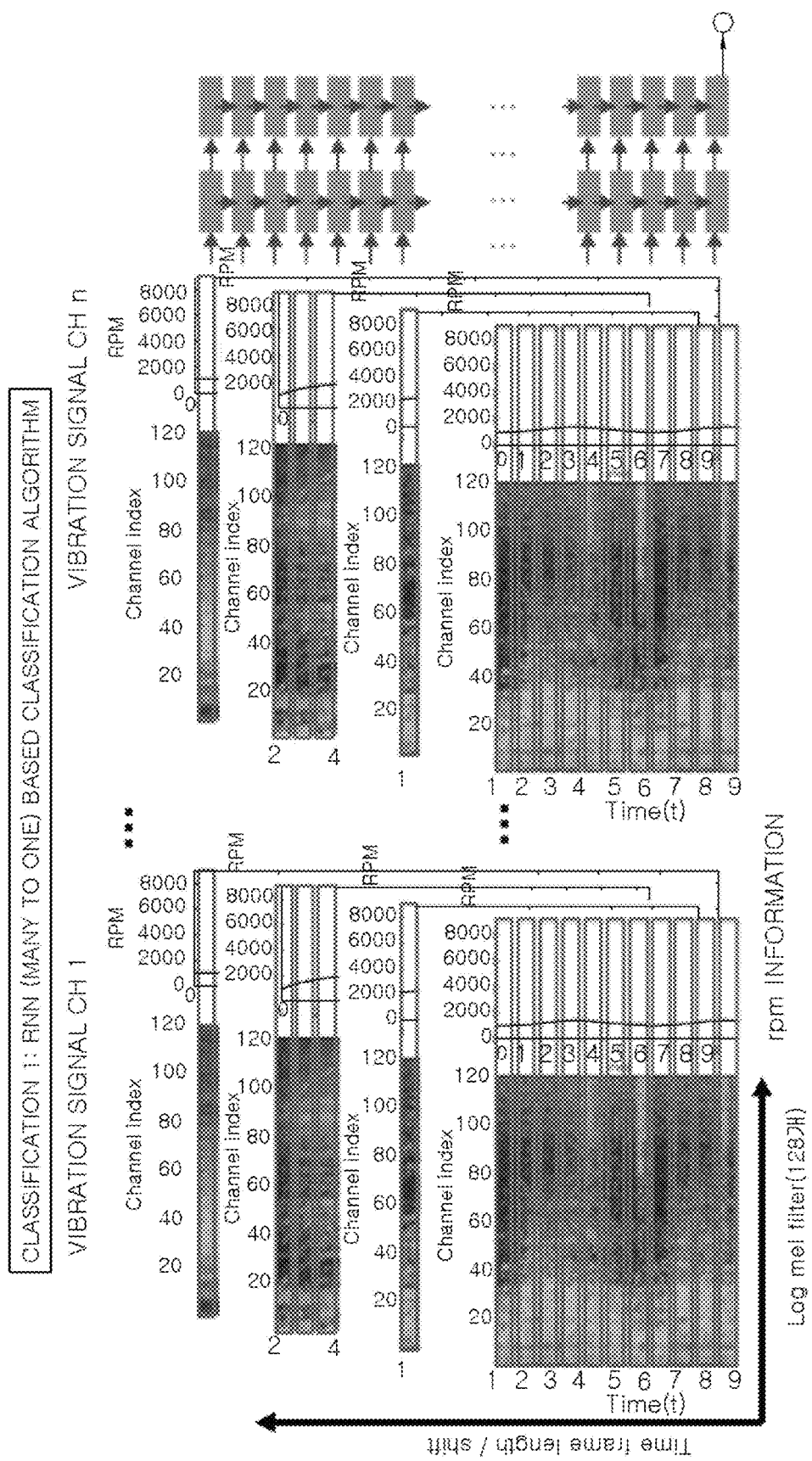

FIG.7A
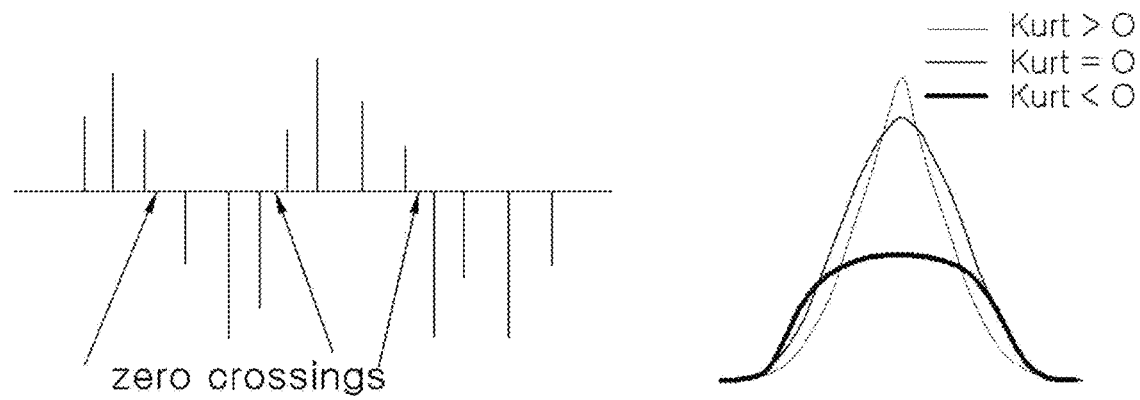
[Zero crossing rate]     [Kurtosis]
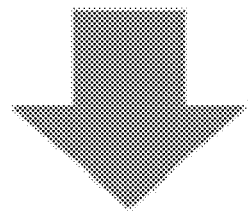
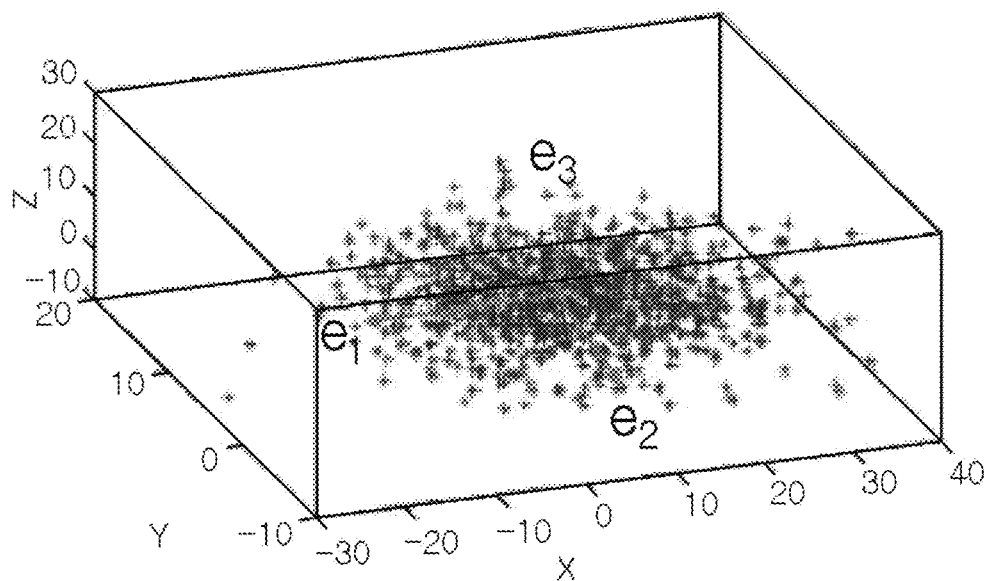
[Principal Component Analysis]

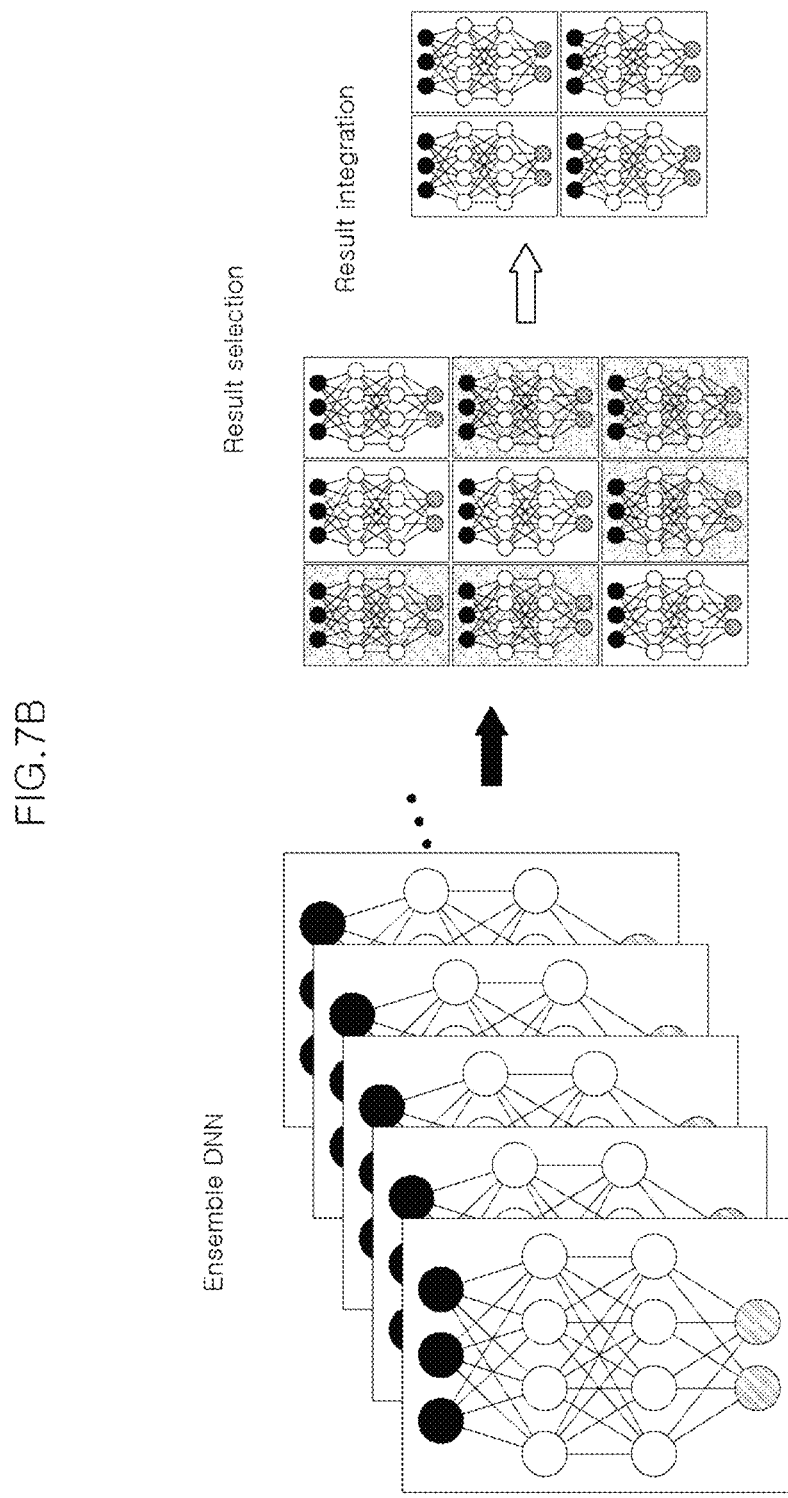

DIAGNOSING METHOD OF ENGINE CONDITION AND DIAGNOSTIC MODELING METHOD THEREOF

CROSS-REFERENCE(S) TO RELATED APPLICATIONS

This application claims priority to Korean Patent Application No. 10-2019-0070695, filed on Jun. 14, 2019 which is incorporated herein by reference in its entirety.

BACKGROUND

Field of the Disclosure

Exemplary embodiments of the present disclosure relate to a method of diagnosing an abnormal state of an engine using deep learning-based artificial intelligence (AI) and a method of configuring a diagnostic model.

Description of Related Art

A human brain is comprised of a number of nerve cells which are called neurons. Each of the neurons is connected to hundreds to thousands of other neurons through a synapse which is called a connection point. Each of the neurons receives electrical and chemical signals from other neurons which are connected thereto and polymerizes these signals in a cell body. When a polymerized value is greater than a threshold, i.e., an inherent limit of the neuron, the neuron is activated to transmit an output to adjacent neurons through an axon. An information exchange between neurons is performed in parallel, and a function of such an information exchange is improved by learning.

"Artificial intelligence (AI)" is a highest concept in terms of a technical structure in a related field. The AI is a technology which allows, at some future day, computers and robots to imitate a human brain and a neuron neural network and think and act like humans.

Researches are continuously carried out on a control system based on learning related to the AI even in a vehicle. However, up to the present, the AI is merely applied as a technology which combines speaker recognition (voice recognition) with a mobile information technology (IT) in the vehicle.

That is, examples of application of the AI to the vehicle include a navigation and an audio manipulation through voice recognition and an application manipulation through a smartphone interlocking.

Meanwhile, a vehicle is a finished product comprised of tens of thousands of components, and even when some of the components fail, it is not easy to identify a problem and accurately determine which component fails.

Accordingly, when a component failure diagnosis is performed using deep learning-based AI, it is possible to identify and repair failure components more accurately and quickly.

The present disclosure relates to a method of diagnosing an abnormal state of an engine by constructing a diagnostic model for diagnosing an abnormal state of the engine which is a core component of a vehicle.

The conventional diagnosis of abnormality of an engine is only possible through a simple state check under a condition of an end of line (EOL) which is a final operation in which diagnosis of an abnormal state is possible during an engine production process. That is, as shown in FIG. 1, when a final state is checked during the engine production process, normality and abnormality of the engine is simply diagnosed by comparing only levels of frequencies such that a composite diagnosis is not performed with respect to an abnormal state of the engine.

Conventionally, as shown in the drawing, a reference value which is compared with a vibration dB level and a Kurtosis level is set by a specific frequency filter using test data in an abnormal state and then the reference value is simply compared with the vibration dB level and the Kurtosis level. Consequently, when a composite abnormal state occurs, the reference value cannot be set.

Normality from abnormality of the engine should be classified during the engine production process. When the abnormality is not classified and then is discovered after a vehicle is assembled, the engine should be separated from the vehicle.

Therefore, a man hour (M/H) and a cost are consumed in the above process, and when a vehicle in which an abnormal engine is assembled is delivered to a customer, not only a repair cost is consumed but also an image for completeness of the vehicle is degraded.

The contents described in the above Description of Related Art are to help the understanding of the background of the present disclosure, and may include what is not previously known to a person of ordinary skill in the art to which the present disclosure pertains.

SUMMARY

An embodiment of the present disclosure is directed to a method of diagnosing an abnormal state of a vehicle engine using deep learning-based artificial intelligence (AI).

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a method of diagnosing an engine condition includes measuring a vibration of an engine, wherein assembly of the engine is completed in an automated end of line (EOL) process of an engine production; and primarily diagnosing the vibration of the engine during the EOL process using a primary deep learning classification model in which vibration signals of the engine are classified according to a feature through learning using a plurality of algorithms on the basis of big data with respect to multiple vibration signals measured at three or more positions of the engine, wherein the assembled state of the engine in the EOL process is classified into a normal state or an abnormal state by performing the primary diagnosing of the vibration of the engine.

The measuring the vibration of the engine in the EOL process may include measuring a vibration at positions that are the same as the measurement positions of the multiple vibration signals for the primary deep learning classification model.

The big data with respect to the multiple vibration signals for constructing the primary deep learning classification model may include data for a normal signal and plural types of abnormal vibration signals according to an acceleration or constant speed driving condition.

Each of the multiple vibration signals may include data for an entire frequency range.

More specifically, the primary deep learning classification model may be constructed by sequentially learning the multiple vibration signals using a recursive neural network (RNN) (many-to-one) based classification algorithm, a convolution neural network (CNN)+attention mechanism algorithm, and a DenseNet algorithm.

When the engine in the EOL process is classified as being abnormal in the primary diagnosis, the method of diagnosing an engine condition may further include secondarily diagnosing the vibration of the engine in the EOL process using a secondary deep learning diagnostic model in which a diagnostic reference setting value is determined according to an abnormal case on the basis of the big data with respect to the multiple vibration signals.

The measurement of the vibration of the engine in the EOL process may be re-performed on the engine which is repaired according to the abnormal case diagnosed in the secondary diagnosis.

The method of diagnosing an engine condition may further include storing diagnosis results, which are obtained in the primary diagnosis and the secondary diagnosis, in a central server; and including the data, which is stored in the central server, and vibration data for the engine, which is separately measured, in the big data.

More specifically, the second deep learning diagnostic model may be constructed by learning the multiple vibration signals using frame energy, a pitch, zero crossing, a precise diagnosis algorithm based on a Kurtosis signal processing, binary classification, and an ensemble deep neural network (DNN)/result selection algorithm.

In accordance with another embodiment of the present disclosure, a diagnostic modeling method of an engine condition includes collecting big data with respect to a vibration signal of an engine; measuring multiple vibration signals at three or more positions on the engine in an automated end of line (EOL) process of an engine production; analyzing data and extracting a feature for supervised learning on the basis of the big data and the multiple vibration signals; constructing a primary deep learning classification model in which the vibration signal of the engine is classified according to a feature obtained through learning using a plurality of algorithms on the basis of the big data; and constructing a secondary deep learning diagnostic model in which a diagnostic reference setting value is determined according to an abnormal case classified using the primary deep learning classification model on the basis of the big data.

Each of classification accuracy of the primary deep learning classification model and diagnostic accuracy of the secondary deep learning diagnostic model may be 99.9% or more.

When the classification accuracy of the primary deep learning classification model or the diagnostic accuracy of the secondary deep learning diagnostic model is less than 99.9%, the analyzing of the data and the extracting of the feature for the supervised learning may be re-performed.

The big data with respect to the multiple vibration signals for constructing the primary deep learning classification model may include data for a normal signal and plural types of abnormal vibration signals according to an acceleration or constant speed driving condition.

Each of the multiple vibration signals may include data for an entire frequency range.

More specifically, the primary deep learning classification model may be constructed by sequentially learning the multiple vibration signals using a recursive neural network (RNN) (many-to-one) based classification algorithm, a convolution neural network (CNN)+attention mechanism algorithm, and a DenseNet algorithm.

The second deep learning diagnostic model may be constructed by learning the multiple vibration signals using frame energy, a pitch, zero crossing, a precise diagnosis algorithm based on a Kurtosis signal processing, binary classification, and an ensemble deep neural network (DNN)/result selection algorithm.

BRIEF DESCRIPTION OF THE DRAWINGS

FIGS. 2A and 2B are diagrams illustrating a diagnosing method of an engine condition and a diagnostic modeling method thereof according to the present disclosure.

FIG. 3 is a photograph showing a multiple vibration signal measurement system.

FIGS. 4A, 4B, 5A, and 5B are diagrams showing vibration data for an engine in normal and abnormal states.

FIGS. 6A, 6B, and 6C are diagrams illustrating a classification method according to a primary diagnosis.

FIGS. 7A and 7B are diagrams illustrating a secondary diagnostic algorithm.

DETAILED DESCRIPTION

Reference should be made to the accompanying drawings that illustrate exemplary embodiments of the present disclosure, and to the description in the accompanying drawings in order to fully understand the present disclosure and operational advantages of the present disclosure, and objects attained by practicing the present disclosure.

In the description of exemplary embodiments of the present disclosure, known technologies or repetitive descriptions which unnecessarily obscure the gist of the present disclosure may be reduced or omitted.

Figure 1:
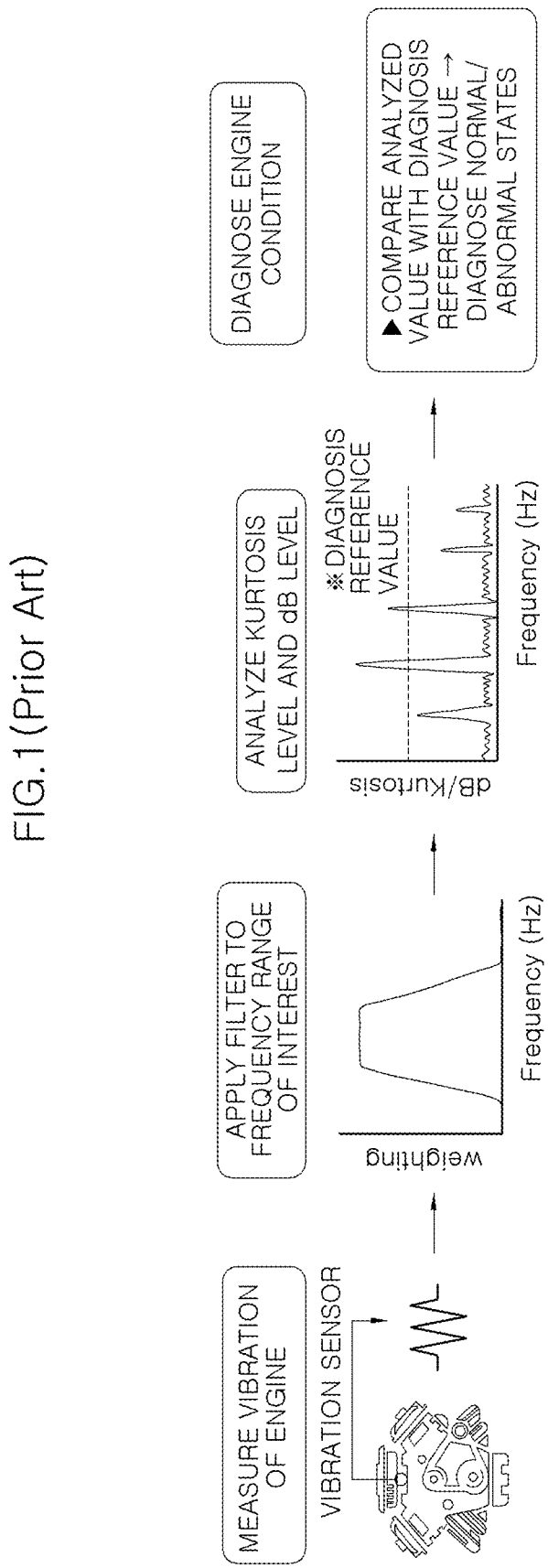
FIG. 1 is a diagram illustrating a conventional process of diagnosing an abnormal state of an engine.
Figure 2B:
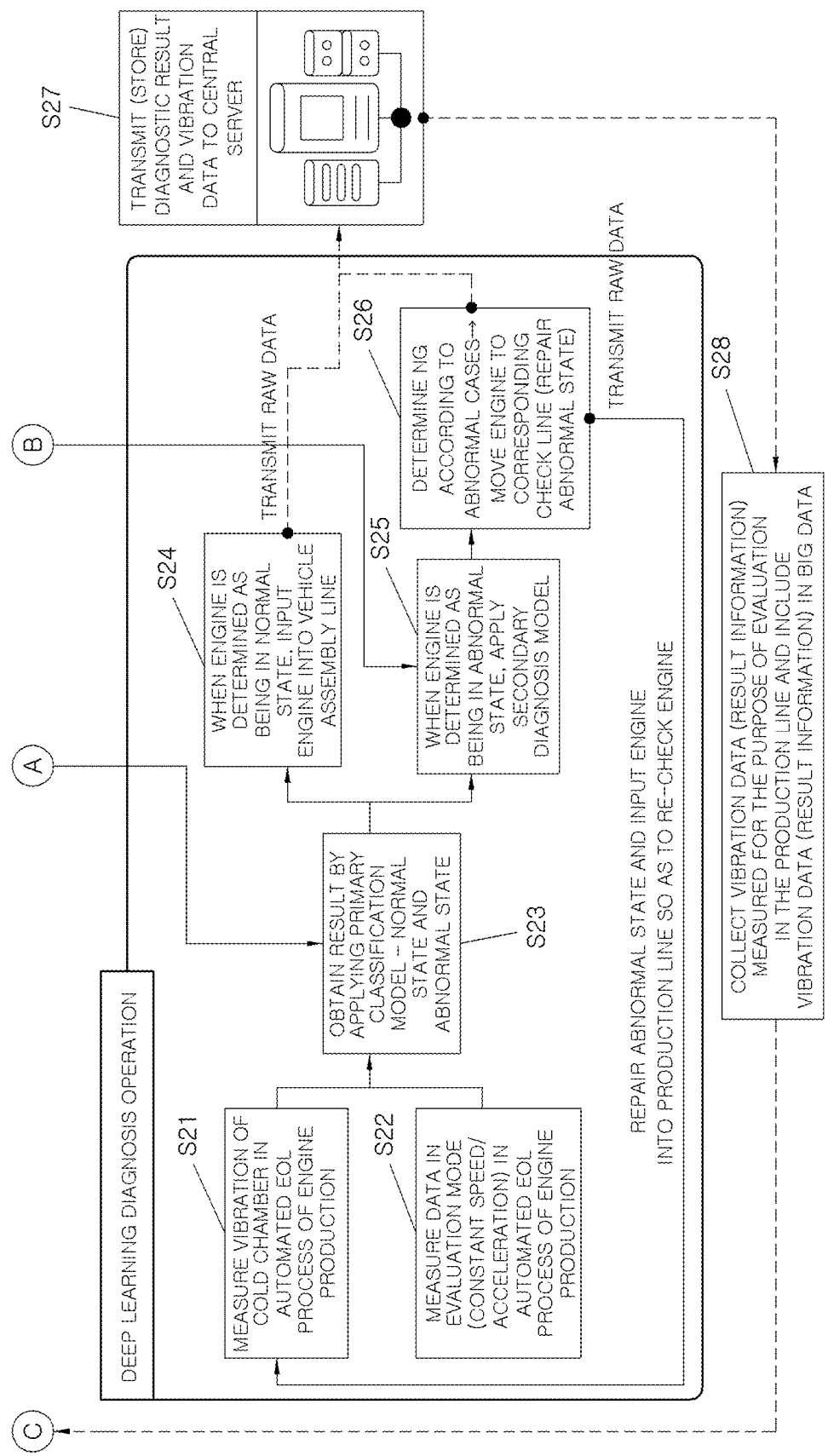
Figure 4B:
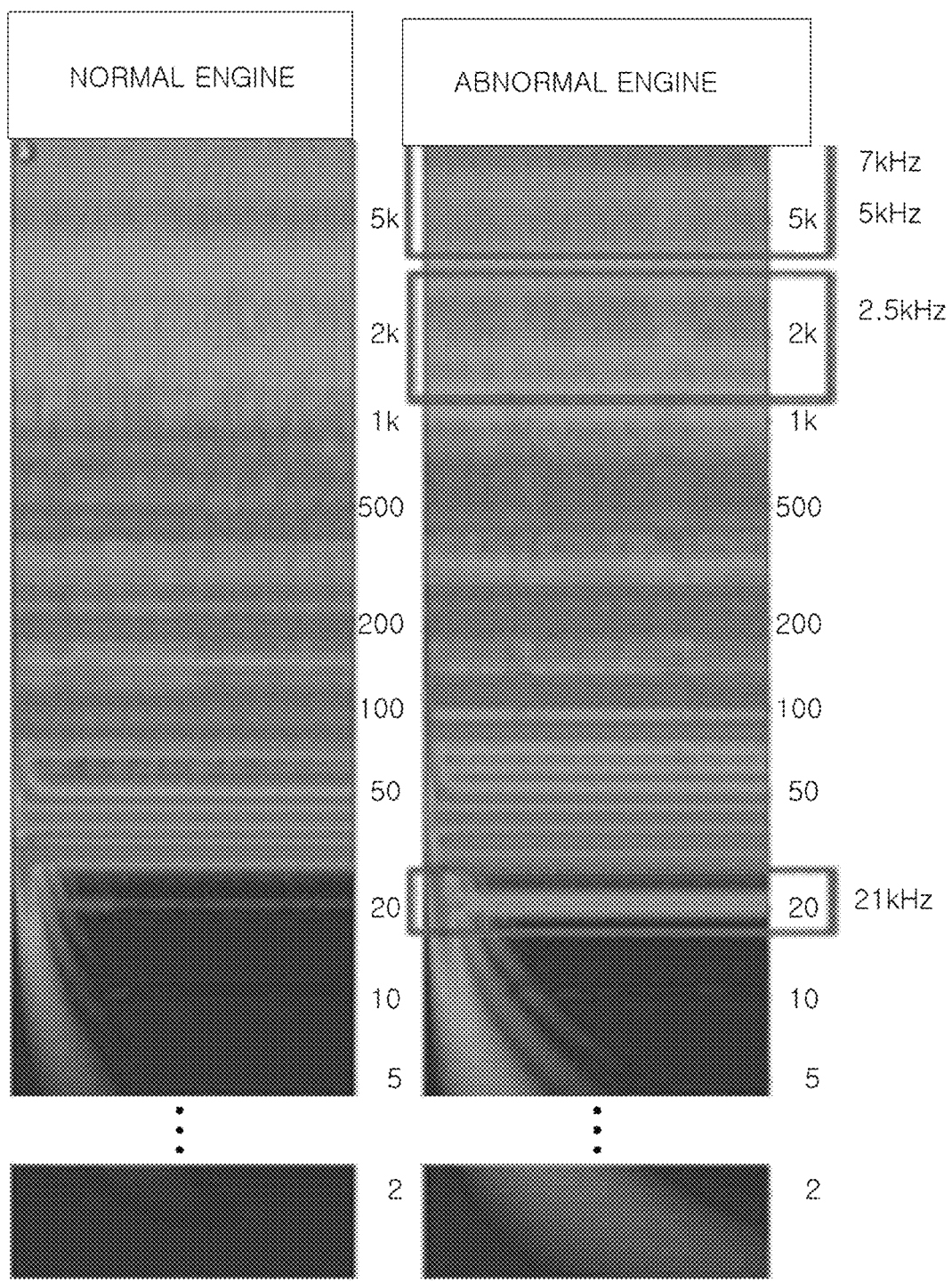
Figure 5B:
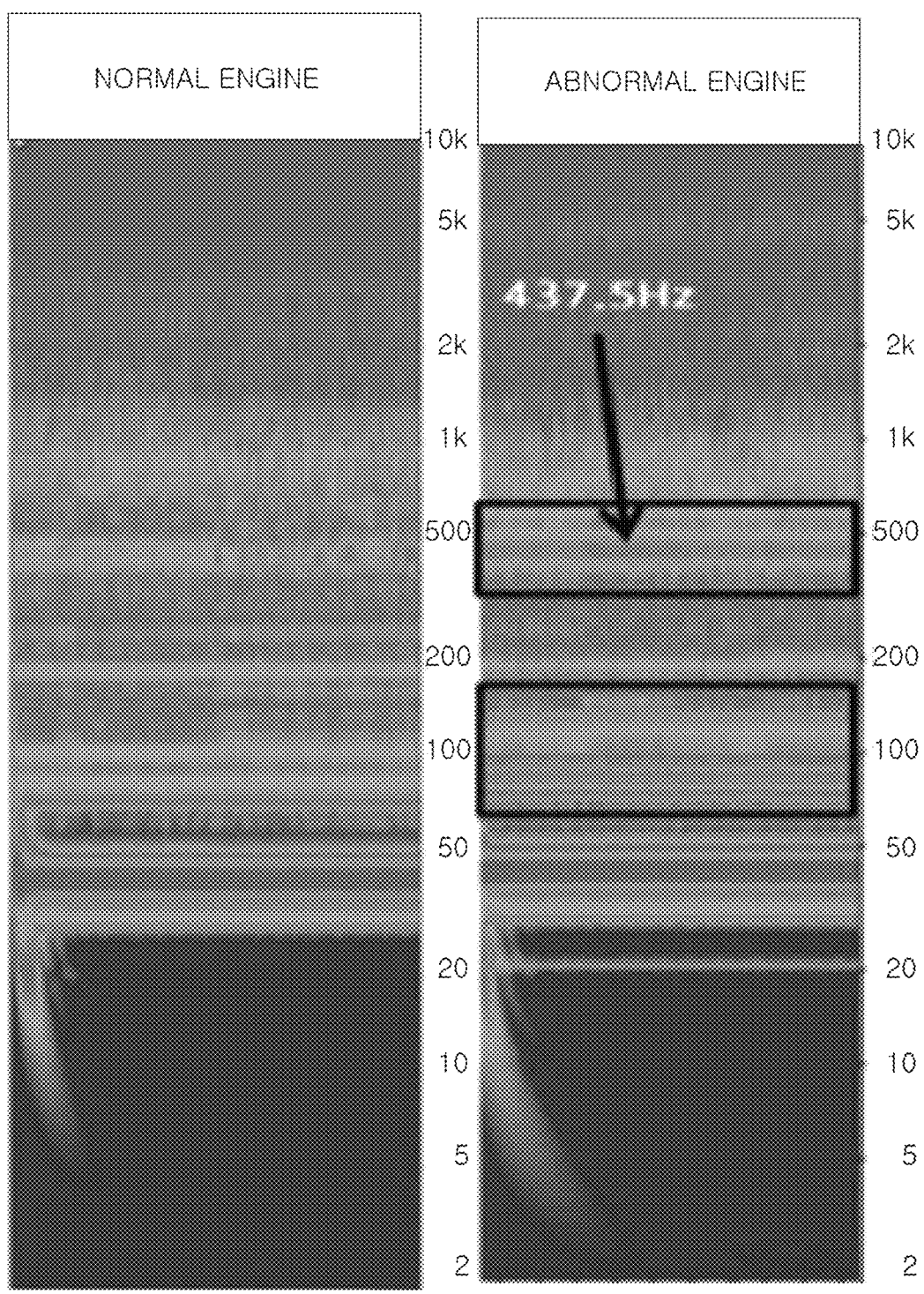

FIGS. 2A and 2B are diagrams illustrating a diagnosing method of an engine condition and a diagnostic modeling method thereof according to the present disclosure.

Hereinafter, a diagnosing method of an engine condition and a diagnostic modeling method thereof according to the present disclosure will be described with reference to FIGS. 2A and 2B.

According to the present disclosure, there is provided a method of constructing primary and secondary deep learning models on the basis of big data with respect to various types of abnormal state conditions using a multiple vibration signal of an engine and diagnosing an engine condition according to the constructed primary and secondary deep learning models.

First, in order to construct a deep learning model, big data with respect to a vibration signal of an engine is collected (S11), and multiple vibration signals are measured at three or more positions on the engine (S12).

The collection of the big data with respect to the vibration signal (S11) is performed by collecting data including vibration data result information, which will be described below, measured for the purpose of evaluation in a production line.

Further, the measurement of the multiple vibration signals of the engine (S12) is performed by a multiple vibration signal measurement system in an automated end-of-line (EOL) process as shown in FIG. 3.

Whether an assembly defect occurs in the engine, which is completed in assembling and transferred, is determined through cold chamber evaluation which is the engine EOL process. The multiple vibration signals of the engine are measured through the multiple vibration signal measurement system.

Since a position and a feature of vibration generation are different according to an abnormal type of the engine, in order to secure high EOL diagnostic accuracy, the measurement of the multiple vibration signals of the engine is performed as shown in the drawing such that a vibration signal is measured at a plurality of positions on the engine. Consequently, diagnostic accuracy may be improved. Then, data for a normal state and an abnormal state is collected according to a plurality of cases.

The measurement of the multiple vibration signals of the engine is required to collect a sync data condition and required for fifteen or more pieces of test data for a learning model and should reflect a deviation characteristic of the engine.

Then, data is analyzed and features for supervised learning are extracted on the basis of the big data collected in operation S11 and the multiple vibration signals measured in operation S12 (S13), a primary deep learning classification model is constructed (S14), and then a second deep learning diagnostic model is constructed (S15).

Classification accuracy in operation S14 is required of 99.9% or more. When the classification accuracy is less than 99.9%, the data analysis and the feature extraction are repeatedly performed in operation S13.

Further, as the modeling result in operation S15, the classification accuracy is required of 99.9% or more. When the classification accuracy is less than 99.9%, the data analysis and the feature extraction are repeatedly performed in operation S13.

The feature extraction of the multiple vibration signals in operation S13 extracts a representative feature on the basis of a multiple channel signal. As shown in FIGS. 4A to 5B, in a normal state and an abnormal state under an acceleration condition and a constant speed condition, a feature and a pattern change are extracted over an entire frequency range instead of analyzing a frequency in a specific range.

That is, features of vibration data are extracted with respect to a normal state and an abnormal state according to a frequency and an operating condition (S13) such that the primary deep learning classification model is constructed by the collected vibration data according to normal and abnormal conditions (S14).

Accordingly, the primary deep learning classification model is constructed by complexly applying algorithms of FIGS. 6A to 6C on the basis of the extracted feature data (S14), and an abnormal state of the engine, which will be described below, is primarily classified according to the constructed primary deep learning classification model (S23).

FIG. 6A shows a recursive neural network (RNN) (many-to-one) based classification algorithm in which main information on each frame is stored and defined as a feature, and n pieces of total feature information are extracted, defined, and stored as features of the multiple vibration signals in the normal/abnormal conditions.

Figure 6B:
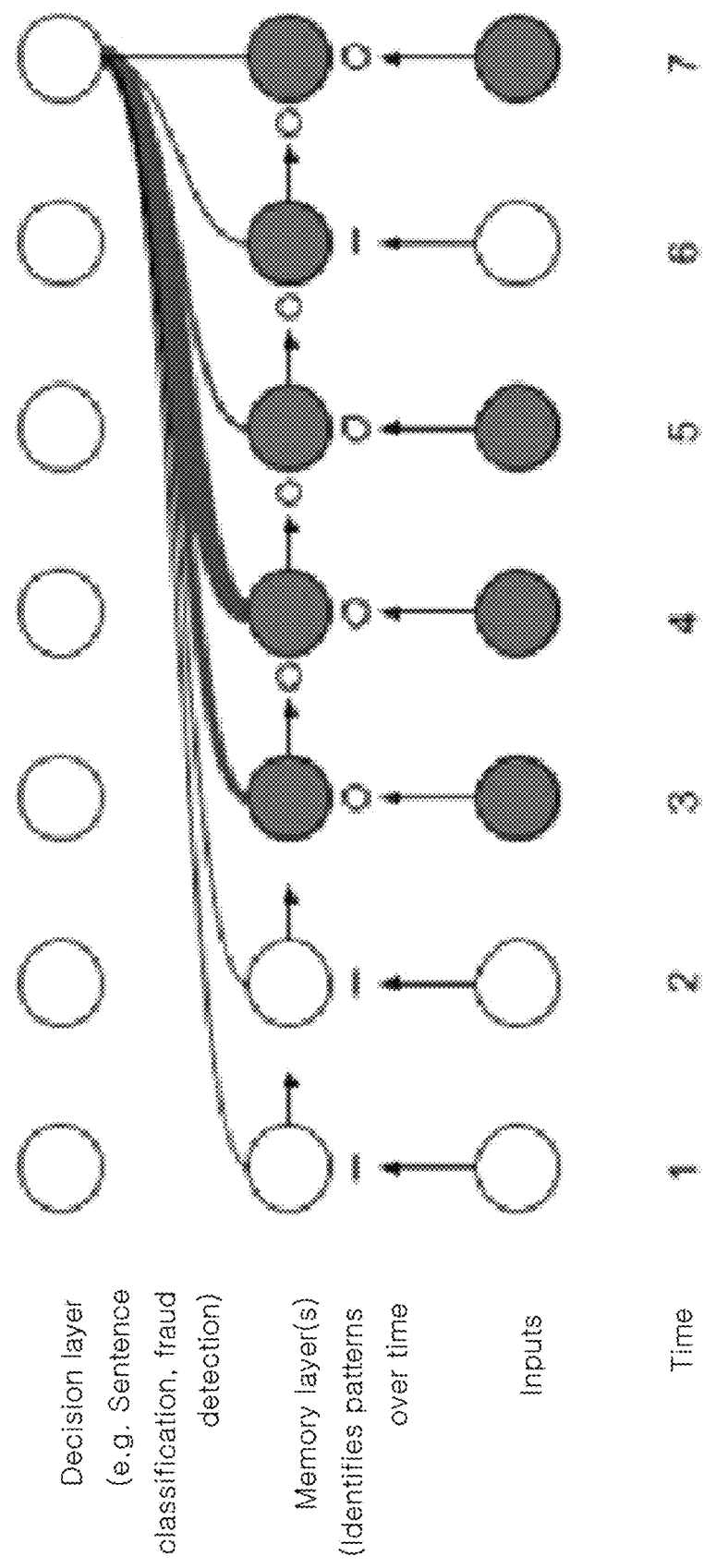

FIG. 6B shows a convolution neural network (CNN)+ attention mechanism algorithm in which an input value of each frame unit of FIG. 6A is shared and information in which an energy change (characteristic) density per frame unit is stored, thereby extracting high probability feature with respect to each vibration signal.

Figure 6C:
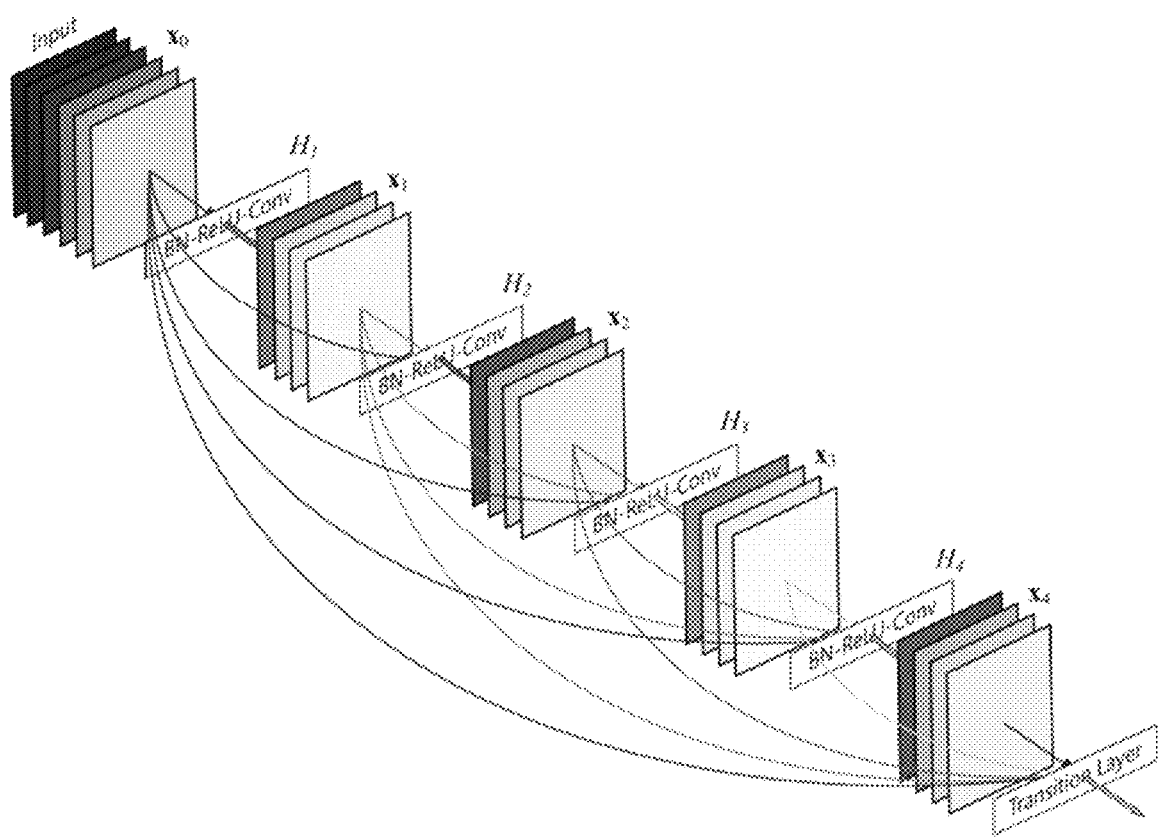

Further, FIG. 6C shows a DenseNet algorithm in which a DenseNet block is applied to form a model with high accuracy at a layer which is close to an input signal, and, unlike the existing DNN, the input signal shares information with all layers to improve the classification model.

As described above, a three-stage composite algorithm is gradationally applied to a multiple vibration input signal (the big data for the supervised learning) such that the classification accuracy of the deep learning model may be improved.

Next, the secondary deep learning diagnostic model is constructed by applying algorithms of FIGS. 7A and 7B (S15).

FIG. 7A shows a first-stage diagnostic algorithm to which frame energy, a pitch, zero crossing, and a Kurtosis signal processing based precise diagnostic algorithm are applied.

The zero crossing is a technique of classifying input signal (vibration) energy using a change of positive and negative values, i.e., classifying a feature using a sign and a magnitude change of a value obtained by multiplying a previous frame data value by a current frame data value. In this case, a feature of a section in which a sign change occurs and a magnitude is significantly varied is main information.

Kurtosis is characterized in that, as a deviation between input data and reference data is large, a Kurtosis value has a large value, and as the deviation therebetween is small, the Kurtosis value has a small value. In this case, when vibration data in a normal state is considered as the reference data, a feature having a large Kurtosis value when vibration data in an abnormal state is input becomes the main information.

Further, a principal component analysis (PCA) algorithm is a non-supervised learning technique and sets a diagnostic division axis using a probability technique. The PCA algorithm is an algorithm characterized by optimizing a classification (detailed diagnosis) division axis with respect to failure types (Case 1, Case 2, . . . Case n) using a variation in absolute value of the frame energy and the pitch, and features of the zero crossing and the Kurtosis.

Next, FIG. 7B shows a two-stage diagnostic algorithm, and a binary classification and an ensemble deep neural network (DNN)/result selection algorithm are applied to the two-stage diagnostic algorithm.

The binary classification is an algorithm structure which exhibits high performance when a hidden layer of a deep learning structure increases in order for an accurate diagnosis.

The ensemble DNN/result selection algorithm allows a more accurate diagnosis, which is a feature of the present disclosure, using multiple input vibration signals. The ensemble DNN/result selection algorithm is an algorithm which learns a multiple channel characteristic, distinguishes important channel information from other channel information, and assigns a high weight to the important channel information, thereby improving the diagnostic accuracy.

According to the present disclosure, it is possible to diagnose the abnormal state of the engine by applying the deep learning models constructed through the above process.

First, referring back to FIG. 2B, in order to diagnose the engine, a vibration of the cold chamber is measured in the automated EOL process of the engine production (S21), and data in an evaluation mode (constant speed/acceleration) is measured in the automated EOL process of the engine production (S22).

It is preferable that the measurement in operation S21 is performed to measure a vibration at the same position at which the collection of the big data of the learning model in operation S11 is performed, and the measurement in operation S22 is performed for the purpose of constantly maintaining a production time.

Thus, the vibration data according to a driving condition of the engine which will be diagnosed is primarily diagnosed by applying the deep learning classification model constructed in operation S14 (S23).

An assembly state of the engine is classified into a normal state or an abnormal state according to the result of a primary classification model compared with a feature vector according to an abnormal condition which is classified into four to five conditions.

Meanwhile, when the engine is determined as being in the abnormal state, a second diagnosis is performed by applying the deep learning diagnostic model constructed in operation S15 (S25), no good (NG) is determined according to abnormal cases by secondarily diagnosing the engine using a second diagnosis model of which diagnostic reference setting value is set according to a category, and a corresponding case among abnormal cases is derived such that the engine may be moved to a check line corresponding to the derived case and then repaired (S26).

Further, in order to re-check the engine after the abnormal state of the engine is repaired, the engine is re-input into the production line in operation S21 such that it is possible to perform diagnosis on the engine.

Raw data and the vibration data for the diagnosis results in operations S24 and S26 are transmitted to a central server and stored therein (S27).

Further, after the vibration data (result information) is collected, the vibration data (result information) measured for the purpose of evaluation in the production line may be included in the big data (S28) such that the learning model may be updated and thus the diagnostic accuracy may be improved.

Alternatively, the diagnosis of the abnormal state of the engine according to the primary deep learning classification model may be performed on the engine to classify only normal and abnormal states, and the diagnosis of the abnormal state of the engine according to the secondary deep learning classification model may be selectively performed on the engine.

As described above, in accordance with the present disclosure, a deep learning model for classifying and diagnosing an abnormal state of an engine is constructed on the basis of big data with respect to a driving condition and multiple vibration signals according to a frequency such that it is possible to accurately diagnose the abnormal state of the engine before the produced engine is assembled.

In accordance with exemplary embodiments of the present disclosure, a deep learning algorithm can be configured in multiple stages on the basis of big data with respect to various cases of abnormal state conditions such that it possible to classify an abnormal case and accurately determine a normal state or an abnormal state.

That is, in addition to comparison of a level, a technique for comparing an energy change flow with a feature image, and an algorithm which compares features over an entire frequency range are configured such that it is possible to diagnose the abnormal state of the engine in a production stage.

While the present disclosure has been described with respect to the accompanying drawings, the present disclosure is not limited to the described exemplary embodiments, and it will be obvious to those skilled in the art that various alternations and modifications may be made without departing from the spirit and scope of the disclosure as defined in the following claims. Accordingly, it should be noted that such alternations or modifications fall within the claims of the present disclosure, and the scope of the present disclosure should be construed on the basis of the appended claims.

The invention claimed is:

1. A method of diagnosing an engine condition, comprising:

measuring a vibration of an engine, wherein assembly of the engine is completed in an automated end of line (EOL) process of an engine production; and primarily diagnosing the vibration of the engine during the EOL process using a primary deep learning classification model in which vibration signals of the engine are classified according to a feature through learning using a plurality of algorithms on the basis of big data with respect to multiple vibration signals measured at three or more positions on the engine, wherein the assembled state of the engine in the EOL process is classified into a normal state or an abnormal state by performing the primary diagnosing of the vibration of the engine; and wherein the primary deep learning classification model is constructed by sequentially learning the multiple vibration signals using a recursive neural network (RNN) (many-to-one) based classification algorithm and a convolution neural network (CNN) and attention mechanism algorithm;

when the engine in the EOL process is classified as being abnormal in the primary diagnosis, secondarily diagnosing the vibration of the engine in the EOL process using a secondary deep learning diagnostic model in which a diagnostic reference setting value is determined according to an abnormal case on the basis of the big data with respect to the multiple vibration signals.

2. The method of claim 1, wherein the measuring the vibration of the engine in the EOL process includes measuring a vibration at positions that are the same as the measurement positions of the multiple vibration signals for the primary deep learning classification model.

3. The method of claim 1, wherein the big data with respect to the multiple vibration signals for constructing the primary deep learning classification model includes data with respect to a normal signal and plural types of abnormal vibration signals according to an acceleration or constant speed driving condition.

4. The method of claim 3, wherein each of the multiple vibration signals includes data over an entire frequency range.

5. The method of claim 1, wherein the measurement of the vibration of the engine in the EOL stage is re-performed on the engine which is repaired according to the abnormal case diagnosed in the secondary diagnosis.

6. The method of claim 1, further comprising:

storing diagnosis results, which are obtained in the primary diagnosis and the secondary diagnosis, in a central server; and including the data, which is stored in the central server, and vibration data for the engine, which is separately measured, in the big data.

7. The method of claim 1, wherein the second deep learning diagnostic model is constructed by learning the multiple vibration signals using frame energy, a pitch, zero crossing, binary classification, and an ensemble deep neural network (DNN)/result selection algorithm.

8. A diagnostic modeling method of an engine condition, comprising:

collecting big data with respect to a vibration signal of an engine;

measuring multiple vibration signals at three or more positions on the engine in an automated end of line (EOL) process of an engine production;

analyzing data and extracting a feature for supervised learning on the basis of the big data and the multiple vibration signals;

constructing a primary deep learning classification model in which the vibration signal of the engine is classified according to a feature through learning using a plurality of algorithms on the basis of the big data; and constructing a secondary deep learning diagnostic model in which a diagnostic reference setting value is determined according to an abnormal case classified using the primary deep learning classification model on the basis of the big data;

wherein the primary deep learning classification model is constructed by sequentially learning the multiple vibration signals using a recursive neural network (RNN) (many-to-one) based classification algorithm, a convolution neural network (CNN) and attention mechanism algorithm.

9. The method of claim 8, wherein each of classification accuracy of the primary deep learning classification model and diagnostic accuracy of the secondary deep learning diagnostic model is 99.9% or more.

10. The method of claim 9, wherein, when the classification accuracy of the primary deep learning classification model or the diagnostic accuracy of the secondary deep learning diagnostic model is less than 99.9%, the analyzing of the data and the extracting of the feature for the supervised learning are re-performed.

11. The method of claim 8, wherein the big data with respect to the multiple vibration signals for constructing the primary deep learning classification model includes data with respect to a normal signal and plural types of abnormal vibration signals according to an acceleration or constant speed driving condition.

12. The method of claim 11, wherein each of the multiple vibration signals includes data over an entire frequency range.

13. The method of claim 8, wherein the second deep learning diagnostic model is constructed by learning the multiple vibration signals using frame energy, a pitch, zero crossing, binary classification, and an ensemble deep neural network (DNN)/result selection algorithm.

* * * * *